United States Patent
Roivainen (10) Patent No.: US 10,776,837 B2
(45) Date of Patent: Sep. 15, 2020

(54) TAXIMETER FOR USE IN VEHICLES AND METHOD FOR THE SAME

(71) Applicant: Semel Oy, Vantaa (FI)

(72) Inventor: Tuomo Roivainen, Hyvinkää (FI)

(73) Assignee: Semel Oy, Vantaa (FI)

( * ) Notice: Subject to any disclaimer, the term of this patent is extended or adjusted under 35 U.S.C. 154(b) by 357 days.

(21) Appl. No.: 15/537,594

(22) PCT Filed: Dec. 16, 2015

(86) PCT No.: PCT/FI2015/050891
§ 371 (c)(1),
(2) Date: Jun. 19, 2017

(87) PCT Pub. No.: WO2016/097485
PCT Pub. Date: Jun. 23, 2016

(65) Prior Publication Data
US 2018/0268447 A1 Sep. 20, 2018

(30) Foreign Application Priority Data

Dec. 19, 2014 (FI) ..................... 20146117

(51) Int. Cl.
*G06F 17/00* (2019.01)
*G06Q 30/02* (2012.01)
(Continued)

(52) U.S. Cl.
CPC ......... *G06Q 30/0284* (2013.01); *G07B 13/00* (2013.01); *G07B 13/04* (2013.01);
(Continued)

(58) Field of Classification Search
CPC .... G06Q 30/0284; G07C 5/085; G07B 13/00; G07B 13/08; G08G 1/20
(Continued)

(56) References Cited

U.S. PATENT DOCUMENTS 3,764,782 A 10/1973 Spauszus et al.
4,045,656 A 8/1977 Scott
(Continued)

FOREIGN PATENT DOCUMENTS

CA 2932019 A1 * 6/2014 ............. G07B 13/00
CN 1065944 A 11/1992
(Continued)

OTHER PUBLICATIONS

Md. Tofiqul Islam; "Design and Fabrication of Fare Meter of Taxicab Using Microcontroller"; Dec. 28-30, 2005; Proceedings of the International Conference on Mechanical Engineering 2005 (ICME2005), Dhaka, Bangladesh ICME05-AM-03, 5 pages (Year: 2005).*

(Continued)

*Primary Examiner* — Shannon S Campbell
*Assistant Examiner* — Freda A Nelson
(74) *Attorney, Agent, or Firm* — Berggren LLP (57) ABSTRACT

A taximeter for a vehicle, comprising data interface for obtaining signal indicative of the vehicle speed and/or distance traveled, preferably a speed pulse signal, memory for storing tariff data linking taxi fare with vehicle speed, distance traveled and/or time elapsed, processing unit for dynamically determining, utilizing the obtained signal and tariff data, stroke characteristics for the current situation in terms of dynamically determined stroke value and of dynamically determined stroke interval, and updating the accrued fare after each stroke utilizing the determined stroke characteristics, and display for visualizing the accrued fare. A corresponding method is presented.

10 Claims, 3 Drawing Sheets

(51) Int. Cl.
*G07B 13/04* (2006.01)
*G07B 13/06* (2006.01)
*G07B 13/00* (2006.01)
*G07B 13/10* (2006.01)
*G07B 13/08* (2006.01)
*G06Q 50/30* (2012.01)

(52) U.S. Cl.
CPC ............ *G07B 13/06* (2013.01); *G07B 13/08* (2013.01); *G07B 13/10* (2013.01); *G06Q 50/30* (2013.01)

(58) Field of Classification Search
USPC .................................. 705/13, 417; 340/988
See application file for complete search history.

(56) References Cited

U.S. PATENT DOCUMENTS

| | | | |
|---|---|---|---|
| 5,897,626 A | | 4/1999 | Pomerantz |
| 9,037,852 B2* | | 5/2015 | Pinkus ............... H04L 67/12 713/160 |
| 2008/0030376 A1* | | 2/2008 | Tunnell ................ G07C 5/085 340/988 |
| 2008/0114707 A1* | | 5/2008 | Steiner ............. G06Q 30/0284 705/417 |
| 2012/0123636 A1 | | 5/2012 | Hisatsugu |
| 2013/0006722 A1* | | 1/2013 | Ziomkowski .......... G07B 13/00 705/13 |
| 2014/0067489 A1* | | 3/2014 | James ................... G06Q 50/30 705/13 |
| 2014/0074757 A1* | | 3/2014 | De Gennaro ......... G07B 13/04 705/417 |
| 2015/0310510 A1* | | 10/2015 | Kelly ..................... H04W 4/02 705/13 |

FOREIGN PATENT DOCUMENTS

| | | |
|---|---|---|
| CN | 1024436 C | 5/1994 |
| CN | 101447095 B * | 4/2011 |
| CN | 101447095 B | 4/2011 |
| CN | 201887752 U | 6/2011 |
| DE | 102010047824 A1 | 9/2011 |
| JP | 3226004 B2 | 11/2001 |
| JP | 2004038815 A | 2/2004 |
| JP | 2004217171 A | 8/2004 |
| KR | 1995-0001558 A | 1/1995 |
| KR | 200156727 Y1 | 9/1999 |
| KR | 20040022116 A | 3/2004 |
| KR | 20070062773 A | 6/2007 |
| WO | 2004047046 A1 | 6/2004 |

OTHER PUBLICATIONS

Search report of EP15869405.9 issued by European Patent Office dated Jul. 17, 2018.
Finnish Patent and Registration Office, Search report issued in FI20146117, dated Aug. 17, 2015.

* cited by examiner

TAXIMETER FOR USE IN VEHICLES AND METHOD FOR THE SAME

PRIORITY

This application is a U.S. national application of PCT-application PCT/FI2015/050891 filed on Dec. 16, 2015 and claiming priority of Finnish national application number FI 20146117 filed on Dec. 19, 2014, the contents of all of which are incorporated herein by reference.

FIELD OF THE INVENTION

Generally the invention pertains to taximeters and determination of fare based on a number of determined parameters. In particular, however not exclusively, the present invention concerns determining the stroke value (amount) and interval.

BACKGROUND

Taximeters are devices disposed in taxis to determine a fare to be billed from a customer, i.e. passenger, at the end of a journey based on a number of factors such as distance traveled (e.g. X EUR per kilometer) and/or time elapsed (e.g. Y EUR per hour) since the taxi was assigned to the journey or picked up the customers. Further factors such as day of the week, time of day, waiting time, number of passengers, luggage, advance booking, departure location (e.g. airport), special assistance provided, etc. may also be taken into account in the overall pricing of the trip.

Part of the factors affecting the trip price may be determined by the taximeter in isolation, i.e. independently, responsive to e.g. a button press by the driver indicative of appropriate tariff or other relevant circumstances such as luggage type or departure location, whereas the remaining factors are obtained based on data received from the vehicle itself regarding e.g. the speed of the vehicle. An intermediate, officially approved conversion device, or 'signal generator', may be utilized to convert CAN (controller area network) bus data or corresponding data indicative of vehicle speed or distance to pulses understood by the taximeter in accordance with a predefined standard applied.

Sometimes, both distance traveled and time elapsed are applied simultaneously to determine the fare, which may be called as a 'double' type application of tariff. Alternatively, both charging criteria may be subjected to the same journey but only alternately, which may be referred to as 'single' type application of tariff. Taxi fares are usually more or less strictly regulated by the authorities depending on the country. Accordingly, the taximeters are often to be sealed subsequent to calibration so that related tampering becomes impossible without breaking the seal or other clearly visible part such as a housing thereof.

In addition to keeping track of the fare, the taximeters may comprise or be connected to various other features such as a receipt printer, a communication means, a positioning means, sensors, reporting/logging and payment features.

In terms of UI (user interface) features to enable the driver to interact with the device, the taximeters typically comprise a number of buttons and a display such as a simple LCD (liquid crystal display) type digital readout. A unit incorporating both the display and data input means may be provided with a dedicated housing separated from a main unit with electrical cabling interconnecting the two. The UI unit is located in the vehicle so as to enable the passenger(s) to inspect the read-out during the ride. Often this means upper central position relative to the dashboard, which, on the other hand, causes additional discomfort to the actual device user, i.e. taxi driver, who should be able to control the settings of the rides by operating the user input means such as switches or buttons thereof potentially several times even during a single trip.

In European Union (EU), a so-called Measuring Instruments Directive (MID) and associated annex MI-007 stipulate essential requirements for the taximeters throughout the EU. Having regard to the directive, the taximeters shall calculate and display the fare, incrementing in steps that may be fixed or generally regulated by the particular member state of the EU in question. The step, or 'stroke' (sometimes also 'drop'), may correspond to some fixed value (amount), e.g. 0.20 EUR or 0.10 EUR, while the interval between successive strokes depends on the vehicle speed and/or time elapsed, as being contemplated above so that the predetermined pricing model such as distance-based pricing is still followed.

The stroke value and interval appear a clear trade-off between a) the perception ability of the passengers and related psychological aspects, and b) the actual accuracy of the fare-determining logic technologically achievable in the taximeter.

Modern measurement and data processing technology would easily provide to for the usage of stroke values with considerably finer resolution in terms of the used currency, e.g. one cent (c) increment in the total fare. However, that could result in basically continuously rolling or changing digits on the display of the taximeter especially when the speed of the vehicle increases, which would, in turn, complicate perceiving the current fare of the ride and appear psychologically generally suspicious to the passengers. Determination of the fare as executed by the taximeter would then seem vague if not directly fraudulent.

Nevertheless, the contemporary practice with the relatively large stroke values causes unavoidable financial losses to the taxi operator as at the end of the journey the ongoing, still unfinished, stroke period cannot be charged from the passenger(s) and the stroke shall be completely omitted. The accrued fare is thus rounded down to the latest amount indicated by the taximeter, still including the effect of a previous stroke completed but not the ongoing stroke. The problem may first seem somewhat negligible but the annual effect thereof is nothing but surprising. Considering e.g. a stroke size of 20 cents, average loss per journey can be estimated to be around 10 cents, which equals to 500 Euros annually with 5000 taxi drives.

SUMMARY OF THE INVENTION

The objective is to at least alleviate one or more problems described hereinabove regarding the taximeters.

The objective is achieved by a taximeter and related method in accordance with the present invention. The suggested solution cleverly technically caters for, among other factors, pleasant and trusty user experience while minimizing unnecessary financial losses to the taxi operator as described in more detail hereinafter. Yet, depending on the embodiment, usability of the taximeter itself from the standpoint of the driver can be enhanced in a number of ways.

In an aspect of the present invention, a taximeter for a vehicle, comprises data interface for obtaining signal indicative of the vehicle speed and/or distance traveled, preferably a speed pulse signal, memory for storing tariff data linking taxi fare with vehicle speed, distance traveled and/or time elapsed, processing unit for dynamically determining, utilizing the obtained signal and tariff data, stroke characteristics for the current situation in terms of stroke value and stroke interval, and updating the accrued fare that is based on the distance traveled and/or time elapsed, after each stroke utilizing the determined stroke characteristics, and display for visualizing the accrued fare.

In another aspect, a method for controlling a taximeter, comprises storing tariff data linking taxi fare with vehicle speed, distance traveled and/or time elapsed, obtaining signal indicative of the vehicle speed and/or distance traveled, preferably including a speed pulse signal, determining, utilizing the obtained signal and tariff data, stroke characteristics for the current situation in terms of stroke value and stroke interval, updating the accrued fare that is based on the distance traveled and/or time elapsed, after each stroke utilizing the determined stroke characteristics, and indicating the accrued fare via the user interface of the taximeter.

In the above method, typically the items ranging from obtaining the signal and indicating the accrued fare are executed repeatedly as the vehicle moves or at least time goes by, and the fare increases accordingly. In some embodiments, also the tariff data may be updated at least occasionally.

In an embodiment, the taximeter comprises a first housing incorporating the display and a second housing incorporating a user input interface for controlling the taximeter. In some embodiments, also the second housing may include a display or other visual indication means, optionally including a number of LED (light-emitting diode) indicator lights.

Optionally, the display may further be touch-sensitive.

Optionally, a third housing defining a central unit of the taximeter may be provided. Alternatively, the unit could be included in the display-containing first housing or input interface-containing second housing.

Different elements disposed in various housings may be functionally connected together and/or to a power supply using a suitable wiring or cabling. Alternatively or additionally, wireless communication and optionally even energy transfer may be applied for which purpose the concerned elements or generally housings may include transmitter, receiver or transceiver.

The utility of the present invention arises from a variety of issues depending on each particular embodiment in question. Indeed, the present invention offers a feasible technique for adaptive stroke control. The stroke amount and/or frequency (interval) may be dynamically altered responsive to the vehicle speed. As an outcome based on field testing and studies, the passenger(s) will perceive the visualized accrued fare as natural and trustworthy due to pleasant stroke interval while the stroke amount remains adjusted such that the distance travelled/duration spent not already covered by the last stroke is insignificant, which reduces the financial losses caused by 'free ride' leg otherwise arising from unfinished stroke period at the end of the taxi journey. Accordingly, the related aggregate loss may be considerably reduced from the standpoint of a taxi operator considering a larger number of taxi rides over a longer period such as one year.

The solution may be adopted by many existing taximeters as they may already contain the necessary data interfaces, data processing elements and data storage elements for successful execution thereof, if only provided with updated software.

In some embodiments, which could also be implemented independently from the stroke adjustment solution, the taximeter is provided with separate display and control parts that may still be enabled to communicate with each other and/or supply power to each other via wired and/or wireless technology. The display in the first housing may be then cleverly located at a position that is visible to passenger(s), for instance, while the user input interface in the second housing may be located so as to enable easy access thereto by the driver with a reduced need to raise one's arm to reach it, for instance.

Various other advantages will become clear to a skilled person based on the following detailed description.

The expression "a number of" refers herein to any positive integer starting from one (1), e.g. to one, two, or three.

The expression "a plurality of" refers herein to any positive integer starting from two (2), e.g. to two, three, or four.

The expression "data transfer" may refer to transmitting data, receiving data, or both, depending on the role(s) of a particular entity under analysis relative a data transfer action, i.e. a role of a sender, a role of a recipient, or both.

The terms "a" and "an" do not denote a limitation of quantity, but denote the presence of at least one of the referenced item.

The term "fare" refers herein to an accumulating or accruing financial amount due for a trip based the length (distance) and/or the duration thereof. The fare may or may not include additional fees such as an initial hire fee.

Different embodiments of the present invention are disclosed in the dependent claims.

BRIEF DESCRIPTION OF THE DRAWINGS

Next the present invention will be described in greater detail with reference to the accompanying drawings, in which.

DETAILED DESCRIPTION

Figure 1:
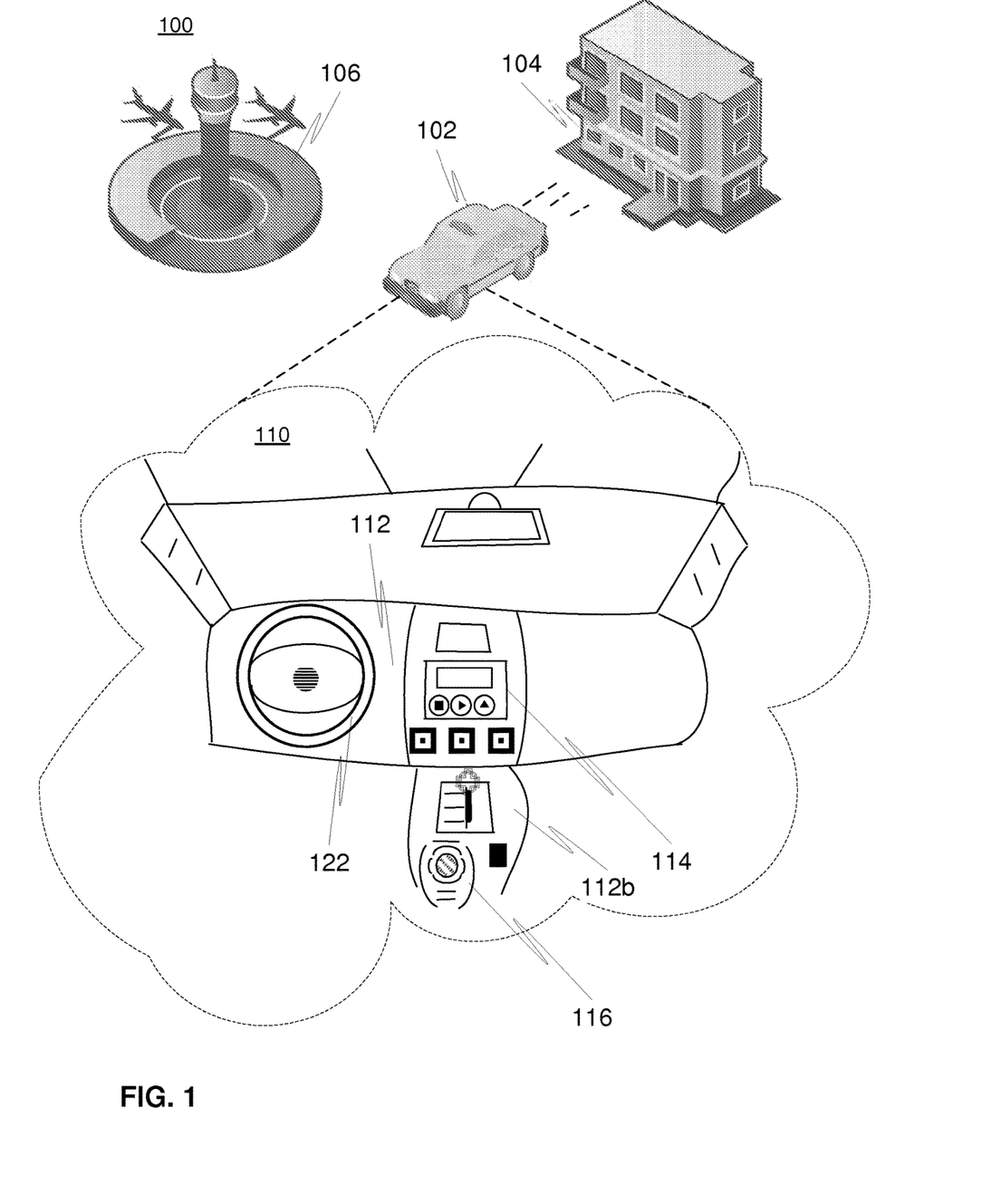
FIG. 1 illustrates one potential use scenario and related embodiment of a taximeter in accordance with the present invention.

In FIG. 1, at scenario 100 a taxi 102, or 'cab', has picked up a number of passengers from location 104 and is heading towards the destination 106, which may refer to an ordinary address or e.g. some more special address, e.g. airport (depicted in the figure). In some contexts, pricing of the trip may depend, besides distance and time, also the actual locations and their nature.

For example, taxi trip originating from a special location such as airport 106 may generally cost more.

The taxi 102 has been provided with an embodiment of a taximeter 114 in accordance with the present invention.

Sketch of taxi interior 110 has been provided in the figure. The dashboard 112 or other suitable support within the taxi may be provided with the taximeter 114. The taximeter 114 may be attached to such substrate using applicable fastening means, such as screws, bolts, adhesive, adhesive tape, clip(s), hook-and-loop type fastener, rack, friction-based fastening, etc.

The taximeter 114 or a component thereof, e.g. a remote controller 116 for providing user input, may be located at the console 112*b* or armrest between the seats, or on the steering column or steering wheel 122, for example. The controller 116 may also be fastened as discussed above.

The taximeter 114 may further comprise a central unit with a dedicated housing or at least housing separate from the one of the display unit, for instance, so that the two may be located independently in optimum positions within the vehicle 102. For example, the central unit may be disposed/hidden within the dashboard whereas the display unit may be located in a central position visible to the driver and the passengers.

Figure 2:
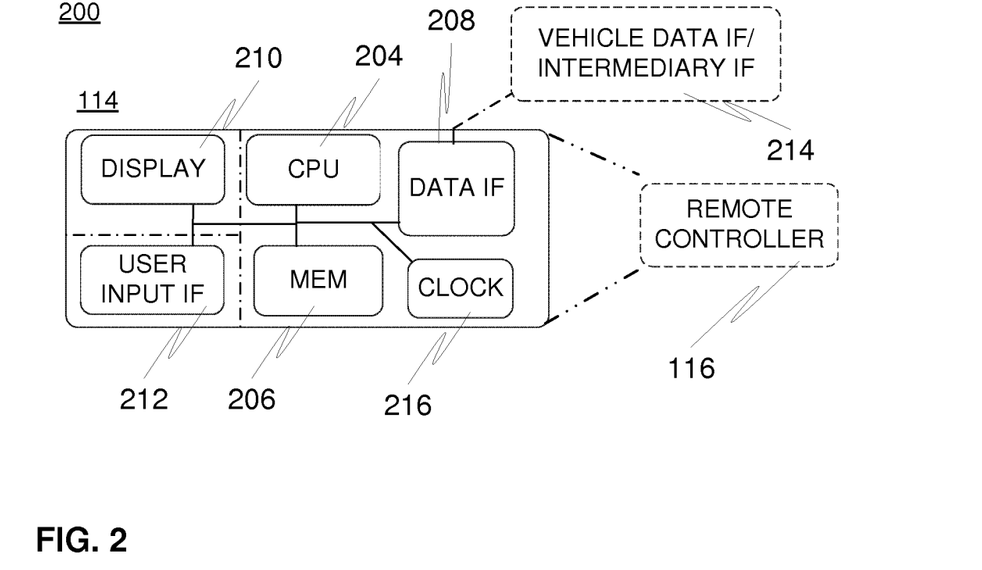
FIG. 2 is a block diagram depicting high-level internals of few embodiments of the taximeter.

FIG. 2 discloses a block diagram 200 collectively depicting high-level internals of few slightly varying embodiments of the taximeter. The taximeter 114 may include at least one processing unit 204, a memory chip 206, user input interface 212, display 210, and a number of interfaces 208 for data transfer and e.g. power supply. These elements may be provided as integrated in a common housing, which may be molded, for example. Alternatively, as the dotted lines within the main rectangle indicate, various elements may be physically provided in separate housings or even omitted from the implementation, for instance, while the existing elements, although potentially being physically distributed, still functionally establish a taximeter of the present invention. For example, the display 210 may be provided as an independently locatable, housed element with necessary interfacing means whereas another housing defines a central unit, or 'central box', comprising e.g. the processing unit 204, memory 206 and data interface 208 coupled to the external vehicle data interface 214 such as a CAN bus or intermediate device, such as a signal generator, establishing and providing e.g. pulse signal based on the speed, distance and/or other data provided by the original electronics of the vehicle.

User input interface 212 such as a number of buttons, switches, keys, touchpad, slide switch, roll, rotary switch, knob, stick controller, a keypad, push switch, or touchscreen functionality may be provided, optionally together with the separate display 210 as integrated therewith. Voice user interface (VUI) may be provided as well. Alternatively or additionally, a remote controller 116 may be provided to obtain control input from the user. In case a remote controller 116 is provided, integral user input interface 212 may be omitted from the implementation. However, nothing prevents from providing both user input interfaces 212 and 116 to the same embodiment, and it may actually turn out beneficial in terms of versatility of the UI. Optionally, the functions or input commands providable by the interfaces 212, 216 may be mutually similar, overlapping or different.

The processing unit 204 may include a microprocessor, a microcontroller, a digital signal processor, or a programmable logic chip among other options. The memory 206 may include a number of dedicated or processor-integrated memory chips, for example. Non-volatile memory such as ROM (read-only memory) or Flash ROM may be provided for storing instructions, such as program code, and e.g. parameters regarding tariffs more permanently, while RAM (random-access memory) or generally volatile memory may be provided for temporarily storing various other data such speed data obtained from the external interface 214. The memory 206 may further refer to a hard disc, detachable memory card, optical disc, etc.

Yet, the taximeter may include a clock or timer circuitry 216 based on e.g. electronic (typically crystal) oscillator and related circuitry for providing time information to the processing unit 204 and potentially other elements. Alternatively or additionally clock or generally time signal could be received from an external source (clock) e.g. via the interface 208.

Time signal may be utilized for determining the stroke characteristics together with the obtained external signal (e.g. distance or speed signal) and tariff data, and obviously for determining the fare itself. For example, vehicle speed may be determined using distance signal and time signal, or distance may be determined using speed signal and time signal.

Yet, the clock or time signal may be generally used within the taximeter, e.g. by the processing unit 204 thereof, to schedule and synchronize various tasks executed. The clock 216 may be alternatively integrated with other elements, e.g. with the processing unit 204 itself. In some embodiments, multiple clocks or time signals may be provided (internally and/or externally generated), e.g. one for internal scheduling/synchronization of tasks and the other for stroke and/or fare determination.

The aforesaid interface 208 refers to at least one data interface for receiving data signal e.g. in the form of distinguishable pulses from the vehicle electronics or aforesaid intermediate elements regarding e.g. vehicle speed or distance traveled. According to an embodiment, the data interface comprises necessary connector(s) and further electronics such as a/d converter to be able to receive and process analogue pulses e.g. from a pulse generator 214 connected to the data bus of the vehicle such as the CAN bus, the pulses being indicative of vehicle speed or distance traveled. For example, the pulse amplitude and/or frequency may be indicative of such parameter values. Alternatively, digital data transfer may be applied.

Yet, the interface 208 may refer to further interfaces depending on the embodiment. For example, positioning data receiver such as GPS (Global Positioning System) or GLONASS (Global Navigation Satellite System) receiver may be provided for capturing satellite positioning information to determine the position of the vehicle.

A number of wireless transceivers for communication with external elements or networks, or elements accessible through the networks, may be provided. For instance, the system of the taxi operator may be communicated with using voice connection and/or data messages. Voice call/mobile phone functionality may be generally implemented as well as desired instant or short messaging features. The transceiver(s) may include a cellular network transceiver (e.g. GSM (Global System for Mobile Communications), UMTS (Universal Mobile Telecommunications System)/3G, or 4G/LTE (Long Term Evolution)), a WLAN transceiver, Bluetooth or Bluetooth Low Energy transceiver, or some other, potentially proprietary, transceiver.

Still further, different internal interfaces (wired, wireless, electrical, optical) between the integrated or possibly physically distributed elements of the taximeter 114 may naturally be utilized as being appreciated by a person skilled in the art. Each interface may be configured for power transmission and/or communication purposes.

The display 210 may refer to at least one simple numeric or alphanumeric read-out style display or a more comprehensive flat-panel display of LED (light-emitting diode) or OLED (Organic LED) type, for instance. It may be provided with touch-screen functionality, e.g. with capacitive, resistive or optical touch detection, and thus integrate at least part of the user input interface 212 therewith. In some embodiments, the taximeter may include a plurality of displays of mutually similar or different characteristics (e.g. size, technology, intended use, etc.). Yet, the taximeter may include a number of status indicator lights such as LEDs for visually reflecting the state, e.g. on/off state, of the device to the user.

Figure 3:
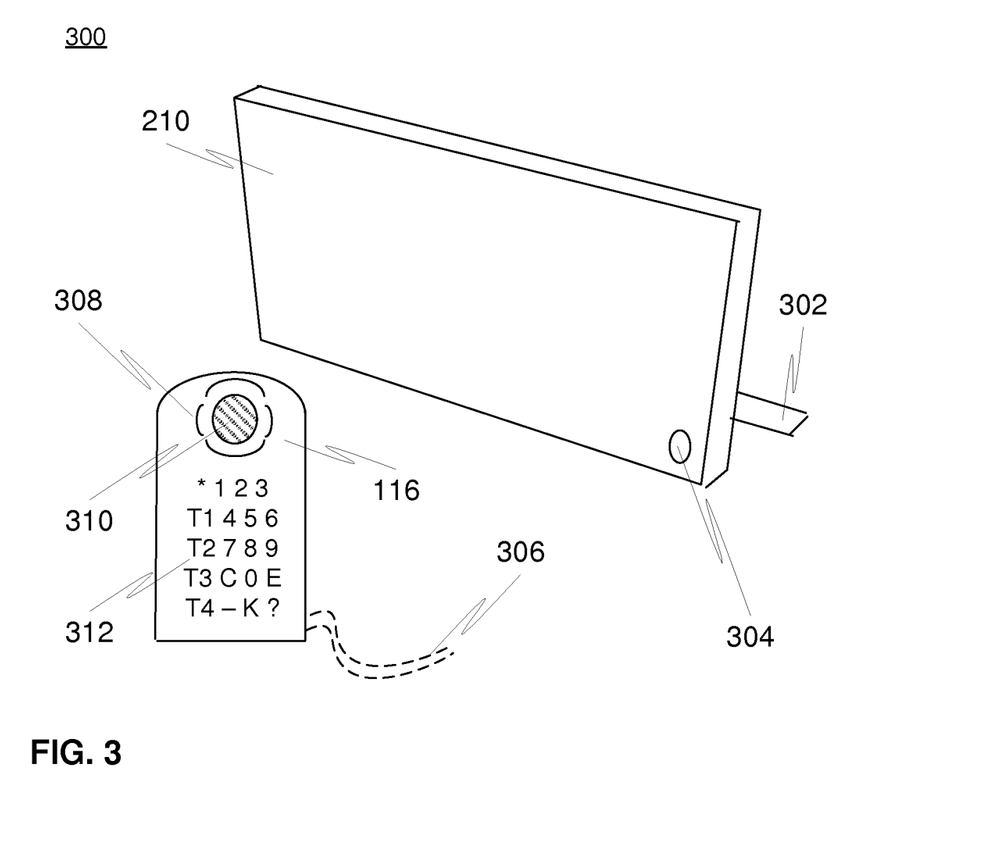
FIG. 3 illustrates an embodiment with separate display and user input devices.

FIG. 3 illustrates an embodiment of the taximeter incorporating physically separate display 210 and user input elements 116 (remote controller). As mentioned hereinbefore, in some embodiments the display 210 may be integrated with other taximeter elements such as the processing unit 204 in a common housing excluding the remote controller 116. In some other embodiments, a third physical entity, such as the aforementioned central unit accommodating e.g. the processing unit 204 may be provided and at least functionally connect both to the display 210 and remote controller 116.

Accordingly, the elements 210, 116 have been visualized with wiring/cabling 302, 306 in the figure to reflect the fact that they may be powered using suitable wiring or cabling connecting to (electrical) energy providing element(s) such as the central unit, and/or at least communicate therethrough.

Indeed, in some embodiments the remote controller 116 may be configured to forward user-initiated commands preferably wirelessly towards the processing unit 204 of the taximeter no matter whether the processing unit 204 is integrated with the display 210 or provided in a separate housing. Instead of or in addition to electrical wiring for powering the remote controller 116, it may contain internal rechargeable battery or a slot for rechargeable or disposable batteries.

As a further option, the controller 116 may include a wireless energy capturing means such as inductive coupling or inductive resonant coupling-configured coil structure with necessary support electronics. The vehicle or remaining portion of the taximeter (e.g. display or central unit) may correspondingly include a wireless energy transmitting means.

The display 210 may be supplemented with a number of indicator lights such as LEDs 304. They may indicate e.g. on/off status or some other state of the taximeter.

The remote controller 116 may in this and other embodiments include a number of user accessible control input means 310, 312 such as a trackball, stick controller (may be pivotable and optionally pressable to provide control input), touchpad, buttons, keypad, touchscreen, etc. with reference to further examples already mentioned herein before relative to the interface 212. In the shown configuration, a circular or dome-like control ball or stick-type central element 310 (may be spring-centered) is surrounded by multiple buttons 308 or other input elements. Already the element 310 itself may be configured to sense in two or three dimensions (detecting e.g. presses and/or lateral movement), which provides for complex input with relatively modest hand/arm movement. The buttons 308 further enhance such multifunctional control input solution. The provided buttons/keys 312 enable fast selection of associated numbers or functions, e.g. tariff code, by the user.

Figure 4:
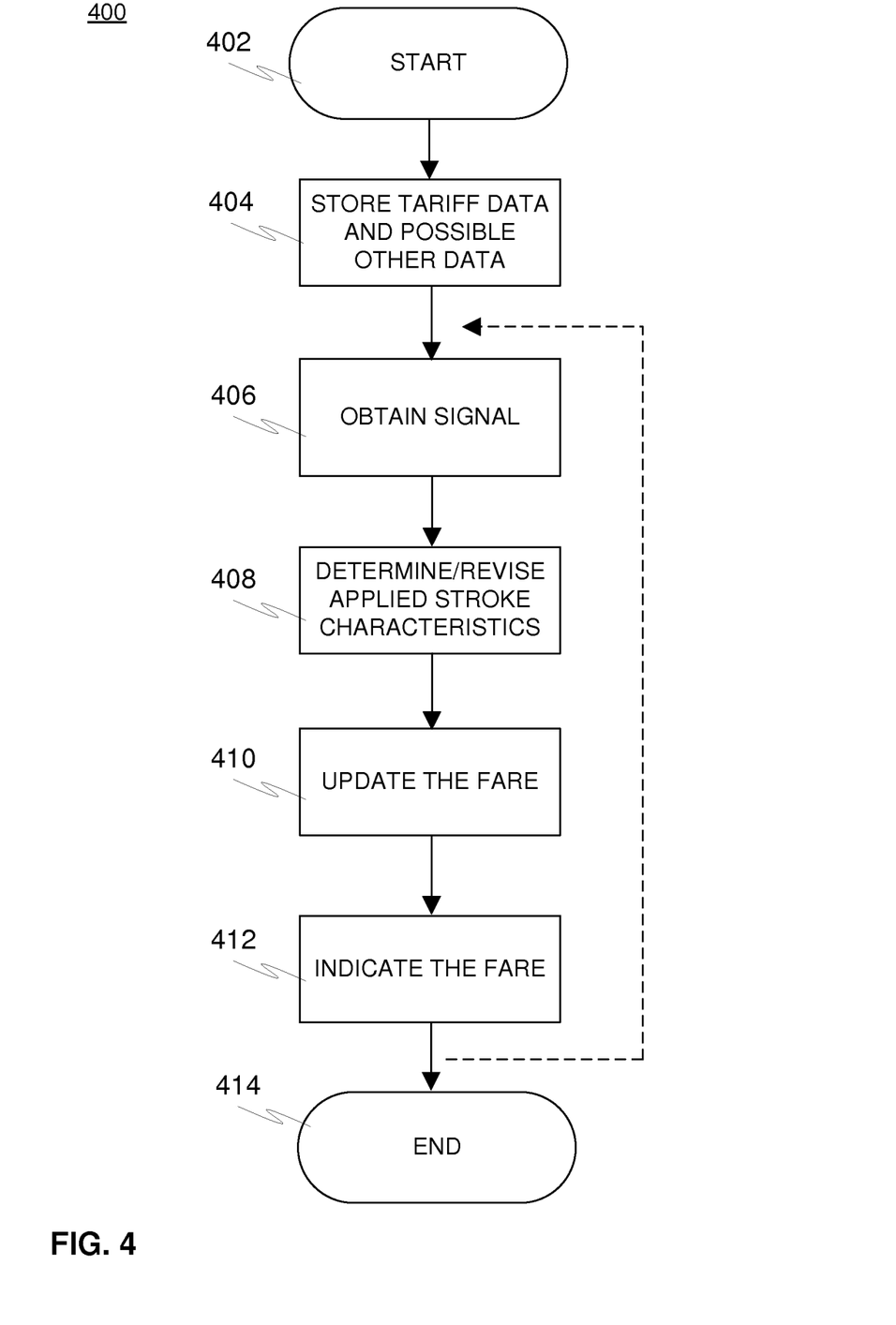
FIG. 4 is a flow diagram of an embodiment of a method in accordance with the present invention.

FIG. 4 is a flow diagram of an embodiment of a method in accordance with the present invention.

At start-up 402, the necessary gear establishing the desired taximeter setup may be obtained, potentially installed to the vehicle and powered up, for instance.

At 404, the necessary data for properly determining trip fares in the first place, such as tariff rates, are provided. Either the user may input such data via the UI of the taximeter or such data may be provided by the device manufacturer, importer, taxi operator, etc., optionally remotely via available preferably wireless data transfer features. For example, cellular connection may be applied for the data transfer. Yet, the overall (software) logic for handling dynamic stroke selection may be installed at this stage. Data associating speed and/or distance data with stroke characteristics such as value (amount) and interval may be provided. The nature of such data and related logic is described, by way of example, in further detail hereinafter with reference to Table 1.

Especially the method items 406-412 may be repeatedly and sequentially executed during a journey, whereupon they are covered by a loop-back arrow in the figure. However, a skilled person realizes that also e.g. item 404 may be (re-)executed upon need such as after update in the tariffs or related data/logic. The dotted loop-back arrow depicts the likely repetitive nature of the execution of various method items so that the stroke characteristics may be dynamically, e.g. practically continuously, adapted to the current situation having regard to vehicle speed, for example.

At 406, a trip begins (the driver may manually commence fare calculation via the UI of the taximeter) and the receipt of signals indicative of vehicle speed and/or distance travelled is started. The signal may be provided by the vehicle electronics or intermediate device such as a (pulse) signal generator as deliberated hereinbefore. The signal may, as such, exhibit the speed, distance, and/or time, or such information may be derived therefrom by processing. The signal may be analogue, in which case it may be digitalized by a/d converter preferably included in the taximeter. Alternatively, the signal may be digital.

At 408, the signal(s) is utilized to determine the stroke characteristics best suiting the ongoing situation. For example, with reference to Table 1 below, single tariff type fare may be utilized such that below certain cross-over speed, 'time tariff' is used for determining the fare whereas during periods when the speed is greater than the cross-over threshold, the distance-based tariff is valid. At least the distance-based tariff may further incorporate different classes or codes depending on the number of persons (passengers) in the taxi (more persons→larger amount).

Data structure such as at least one data table, database or some other applicable data entity may be used to store information defining valid stroke characteristics by linking such characteristics with the vehicle speed and a number of potential other affecting factors such as the aforesaid number of passengers. Based on the speed and potential other factors, the processing unit of the taximeter may then determine, using the stored information, e.g. the applicable stroke amount (e.g. in cents, 'c') and interval (e.g. seconds, 's'). Suitable intervals for potential stroke amounts have been calculated for each speed (lower limit) in the table (columns). The calculation may be executed as follows:

$$\text{Stroke interval (s)} = 3600 \text{ s/h} * \text{Stroke amount (c)} * \text{Tariff amount (km/c)} / \text{Speed (km/h)} \quad (1)$$

Due to extensive testing and knowledge of human psychology, it has been found that stroke interval (typically also meaning the update interval for the accrued fare and visualization thereof) of several seconds is usually preferred. However, increasing the interval too much confuses the passengers and causes unnecessary financial loss as discussed hereinbefore to the taxi operator, whereupon a satisfactory balance or optimum point is necessary to determine.

For instance, having regard to the scenario of Table 1, the intervals and related stroke amounts shown with an asterisk "*" have been selected as potential default values of all the determined ones, i.e. with the speed of 48 km/h, the stroke interval would be 5.9 seconds and the amount 10 cents, whereas speed 53 km/h would convert into interval 9.5 seconds and 20 cents. Some other options providing the same distance-based fare are shown in the Table (respective column) as well with shorter or longer interval and correspondingly linked stroke amount.

So, the selected amounts/intervals are only exemplary but have been found usually satisfactory, if not optimal, in terms of stroke update frequency on the display of the meter and the stroke amount corresponding to the step size for fare accruing. At low speeds below the cross-over threshold, the used stroke may be minimal as indicated in the Table and optionally still depend on speed (i.e. amount/interval decreases with speed).

In some embodiments, the taximeter may be configured to store association between stroke data and speed (or speed range) in advance to be able to determine or basically retrieve the stroke amount and interval rapidly and computationally effectively, e.g. in real-time fashion, from the storage based on the obtained speed data.

In some other embodiments, more calculations may be executed in real-time and e.g. the best suiting stroke amount/interval be selected from a plurality of options depending on a number of additional conditions affecting the situation, e.g. speed change or gradient (is speed decreasing or increasing according to the used inspection criterion), which may be utilized to gradually increase or decrease the used stroke amount and related interval respectively.

As mentioned hereinbefore, external or internally established time/clock signal may further be utilized in the determination of stroke characteristics and the accrued fare.

With reference to Table 2 below, double tariff type example for analysing and finding a suitable stroke interval (i.e. both time elapsed and distance traveled simultaneously affect the fare) is correspondingly shown.

In the depicted example of Table 2, the used time tariff (c/h) was 3500 and distance tariff (c/km) 120.

TABLE 2

Stroke determination (double tariff)
Stroke interval(s) having regard to stroke amount and speed

| | Speed (km/h) | | | | | | | Time tariff |
|---|---|---|---|---|---|---|---|---|
| Stroke (c) | 30 | 40 | 50 | 60 | 80 | 100 | 120 | |
| 1 | 0.5 | 0.4 | 0.4 | 0.3 | 0.3 | 0.2 | 0.2 | 1.0 |
| 2 | 1.0 | 0.9 | 0.8 | 0.7 | 0.5 | 0.5 | 0.4 | 2.1 |
| 5 | 2.5 | 2.2 | 1.9 | 1.7 | 1.4 | 1.2 | 1.0 | 5.1 |
| 10 | 5.1 | 4.3 | 3.8 | 3.4 | 2.7 | 2.3 | 2.0 | 10.3 |
| 20 | 10.1 | 8.7 | 7.6 | 6.7 | 5.5 | 4.6 | 4.0 | 20.6 |
| 50 | 25.4 | 21.7 | 18.9 | 16.8 | 13.7 | 11.6 | 10.1 | 51.4 |

$$\text{Stroke interval (s)} = \text{Stroke amount (c)}/\text{Tariff amount (c/s)} \quad (2)$$

wherein $$\text{Tariff amount (c/s)} = \text{Tariff amount (c/km)}/((1/\text{Speed (km/h)})*3600\ s/h) \quad (3)$$

$$\text{Tariff amount (c/km)} = \text{Time tariff (c/km)} + \text{Distance tariff (c/km), and} \quad (4)$$

$$\text{Time tariff (c/km)} = \text{Time tariff (c/h)}/\text{Speed (km/h)}. \quad (5)$$

Based on the foregoing, a person skilled in the art shall realize that the stroke characteristics such as interval and/or amount may depend, besides e.g. vehicle speed, on the state or status of the taximeter and/or tariff (tariff class or tariff type). For example, in some jurisdictions, the cabs may also transport goods with no passengers, or charge already for the pick-up journey after receiving a new assignment. Accord-

TABLE 1

Stroke determination (Single type application of tariff)

| Tariff Class | Persons | EUR/km | Cross-over speed (EUR/h)/(EUR/km) | km/c |
|---|---|---|---|---|
| I | 1-2 | 1.52 | 28.5 | 0.006579 |
| II | 3-4 | 1.83 | 23.7 | 0.005464 |
| III | 4-5 | 1.98 | 21.9 | 0.005051 |
| IV | 6+ | 2.13 | 20.3 | 0.004695 |

| | | | | h/c |
|---|---|---|---|---|
| Time tariff | €/h | 43.30 | | 0.00023 |

Stroke interval(s) having regard to stroke amount and speed (Tariff 1)

| | Speed (km/h) | | | | | | | Time tariff |
|---|---|---|---|---|---|---|---|---|
| Stroke (c) | 30 | 40 | 50 | 60 | 80 | 100 | 120 | |
| 1 | 0.8 | 0.6 | 0.5 | 0.4 | 0.3 | 0.2 | 0.2 | 0.8* |
| 2 | 1.6 | 1.2 | 0.9 | 0.8 | 0.6 | 0.5 | 0.4 | 1.7* |
| 5 | 3.9 | 3.0 | 2.4 | 2.0 | 1.5 | 1.2 | 1.0 | 4.2* |
| 10 | 7.9* | 5.9* | 4.7 | 3.9 | 3.0 | 2.4 | 2.0 | 8.3 |
| 20 | 15.8 | 11.8 | 9.5* | 7.9* | 5.9* | 4.7 | 3.9 | 16.6 |
| 50 | 39.5 | 29.6 | 23.7 | 19.7 | 14.8 | 11.8* | 9.9* | 41.6 | ingly, the associated stroke characteristics could differ from the situations having passengers on board even if the vehicle speed was the same.

At 410, the accrued fare is updated. Typically, the latest completed stroke (amount) is added thereto.

At 412, the accrued fare is indicated preferably via the display of the taximeter to the passengers.

Alternatively or additionally, some other means of indication, such as an audible indication via a loudspeaker (such as sampled or synthesized speech, or other sound) included in or connected to the taximeter, can be used. As one option, fare data may be signalled to external electronic apparatuses either wiredly or wirelessly, optionally via a wireless network.

At 414, the method execution is ended.

A computer program product embodied in a tangible, non-volatile carrier or transfer medium (e.g. optical disc, memory card, hard disc, etc.) may be provided to execute the desired items of an embodiment of the method.

The present invention has been explained with reference to the various aforementioned embodiments, and several advantages of the invention have been demonstrated depending on the embodiment. It is however clear that the invention is not only restricted to these explicitly disclosed embodiments, but also comprises all possible further embodiments that remain within the scope of the following patent claims.

The invention claimed is:

1. A taximeter for a vehicle, comprising:
data interface for obtaining signal indicative of the vehicle's current speed, preferably a speed pulse signal;
a memory for storing tariff data;
a first housing comprising a display; and
a second housing comprising a processor,
wherein the processor is for determining accrued fare based on the tariff data; and the display is for visualizing the accrued fare,
wherein the memory is configured to store the tariff data in a data structure associating stroke characteristics, including a number of available stroke amounts and related stroke intervals, with corresponding speed ranges, and the processor is configured to dynamically determine, utilizing the obtained signal by the processor and the stored tariff data, stroke characteristics for a current situation including stroke value by the processor and stroke interval by the processor, and update, by the processor, the accrued fare after each stroke utilizing the dynamically determined stroke characteristics including the stroke value and the stroke interval, and
wherein the stroke interval dynamically determined is in the order of magnitude of several seconds and the associations between the stroke intervals, stroke amounts and speed ranges as defined by the tariff data in the data structure are followed in the determination.

2. The taximeter of claim 1, configured to utilize internal clock circuitry for generating or data interface for externally obtaining a time signal for the determination of the stroke characteristics.

3. The taximeter of claim 1, comprising a user input interface for controlling the taximeter by the processor, wherein said taximeter comprises a first housing incorporating the display and a second housing defining a remote controller comprised in the user input interface, the remote controller comprising a number of user input elements and being configured to sense presses and lateral user input via said number of user input elements.

4. The taximeter of claim 3, comprising a third housing incorporating at least the processing unit.

5. The taximeter of claim 3, wherein the remote controller is wireless at least in terms of user-initiated commands sent therefrom.

6. The taximeter of claim 3, wherein the user input interface comprises at least one element selected from the group consisting of: trackball, stick controller, spring-centered controller, central controller element surrounded by one or more buttons, rotatable or pivotable controller element, rotatable or pivotable controller element surrounded by one or more buttons, stick button, key, keypad, switch, touchscreen functionality, voice user interface, touchpad, slide switch, roll, rotary switch, push switch, and knob.

7. A method for controlling a taximeter, comprising:
storing, by a processor, tariff data;
obtaining, by the processor, signal indicative of the vehicle speed, preferably including a speed pulse signal;
determining, by the processor, accrued fare based on the tariff data;
indicating accrued fare via a user interface of the taximeter,
wherein in the above, the tariff data is stored in a data structure associating stroke characteristics, including a number of available stroke amounts and related stroke intervals, with corresponding speed ranges, and stroke characteristics for the current situation, including stroke value and stroke interval, are dynamically determined utilizing the obtained signal and the stored tariff data, and the accrued fare is updated after each stroke; and
utilizing, by the processor, the dynamically determined stroke characteristics including the stroke value and the stroke interval, wherein the stroke interval dynamically determined is in the order of magnitude of several seconds and the associations between the stroke intervals, stroke amounts and speed ranges as defined by the tariff data in the data structure are followed in the determination, wherein a first housing comprises a display and a second housing comprises the processor.

8. A non-transitory computer program product embodied on a computer readable storage comprising code means adapted, when run on a computer, to execute:
storing, by a processor, tariff data;
obtaining, by the processor, signal indicative of the vehicle speed, preferably including a speed pulse signal;
determining, by the processor, accrued fare based on the tariff data;
indicating accrued fare via a user interface of the taximeter, wherein in the above, the tariff data is stored in a data structure associating stroke characteristics, including a number of available stroke amounts and related stroke intervals, with corresponding speed ranges, and stroke characteristics for the current situation, including stroke value and stroke interval, are dynamically determined utilizing the obtained signal and the stored tariff data, and the accrued fare is updated after each stroke; and
utilizing, by the processor, the dynamically determined stroke characteristics including the stroke value and the stroke interval, wherein the stroke interval dynamically determined is in the order of magnitude of several seconds and the associations between the stroke intervals, stroke amounts and speed ranges as defined by the tariff data in the data structure are followed in the determination, wherein a first housing comprises a display and a second housing comprises the processor.

9. A computer readable carrier medium comprising the non-transitory computer program product, the computer readable carrier medium comprising:
   storing, by a processor of taximeter, tariff data;
   obtaining, by the processor, signal indicative of the vehicle speed, preferably including a speed pulse signal;
   determining, by the processor, accrued fare based on the tariff data;
   indicating accrued fare via a user interface of the taximeter, wherein in the above, the tariff data is stored in a data structure associating stroke characteristics, including a number of available stroke amounts and related stroke intervals, with corresponding speed ranges, and stroke characteristics for the current situation, including stroke value and stroke interval, are dynamically determined utilizing the obtained signal and the stored tariff data, and the accrued fare is updated after each stroke; and
   utilizing, by the processor, the dynamically determined stroke characteristics including the stroke value and the stroke interval, wherein the stroke interval dynamically determined is in the order of magnitude of several seconds and the associations between the stroke intervals, stroke amounts and speed ranges as defined by the tariff data in the data structure are followed in the determination, wherein a first housing comprises a display and a second housing comprises the processor.

10. A taximeter for a vehicle, comprising:
    data interface for obtaining signal indicative of the vehicle's current speed, preferably a speed pulse signal;
    a memory for storing tariff data;
    a processor for determining accrued fare based on the tariff data; and
    a display for visualizing the accrued fare, wherein the memory is configured to store the tariff data in a data structure associating stroke characteristics, including a number of available stroke amounts and related stroke intervals, with corresponding speed ranges, and the processor is configured to dynamically
    determine, utilizing the obtained signal by the processor and the stored tariff data, stroke characteristics for a current situation including stroke value by the processor and stroke interval by the processor, and
    update, by the processor, the accrued fare after each stroke utilizing the dynamically determined stroke characteristics including the stroke value and the stroke interval, wherein said taximeter further comprises a user input interface for controlling the taximeter by the processor, wherein said taximeter comprises a first housing incorporating the display and a second housing defining a remote controller comprised in the user input interface, the remote controller comprising a number of user input elements and being configured to sense presses and lateral user input via said number of user input elements.

* * * * *